(12) United States Patent
Joachim et al.

(10) Patent No.: US 8,747,648 B2
(45) Date of Patent: Jun. 10, 2014

(54) METHOD AND DEVICE FOR TREATING LIQUIDS, USING AN ELECTROLYTIC STAGE

(75) Inventors: Neubert Joachim, Holzgerlingen (DE); Karl Ferdinand Staab, Weil der Stadt (DE)

(73) Assignee: Susanne Neubert, Nordhackstedt (DE)

( * ) Notice: Subject to any disclaimer, the term of this patent is extended or adjusted under 35 U.S.C. 154(b) by 754 days.

(21) Appl. No.: 12/450,785

(22) PCT Filed: Apr. 11, 2008

(86) PCT No.: PCT/EP2008/002864
§ 371 (c)(1),
(2), (4) Date: Mar. 22, 2010

(87) PCT Pub. No.: WO2008/125283
PCT Pub. Date: Oct. 23, 2008

(65) Prior Publication Data
US 2010/0187128 A1    Jul. 29, 2010

(30) Foreign Application Priority Data

Apr. 12, 2007   (DE) .......................... 10 2007 017 613

(51) Int. Cl.
*C25B 1/04*    (2006.01)

(52) U.S. Cl.
USPC .................. 205/628; 204/275.1; 205/755

(58) Field of Classification Search
USPC ................................ 205/628, 755; 204/275.1
See application file for complete search history.

(56) References Cited

U.S. PATENT DOCUMENTS

| | | | | | |
|---|---|---|---|---|---|
| 3,188,283 | A | * | 6/1965 | Cole | 205/628 |
| 3,474,023 | A | * | 10/1969 | Bloch | 204/265 |
| 4,038,050 | A | * | 7/1977 | Lowther | 95/1 |
| 2002/0051898 | A1 | * | 5/2002 | Moulthrop et al. | 429/17 |
| 2004/0099522 | A1 | * | 5/2004 | Neubert et al. | 203/10 |
| 2007/0006571 | A1 | * | 1/2007 | Vetrovec | 60/281 |
| 2008/0256933 | A1 | * | 10/2008 | Black et al. | 60/295 |

* cited by examiner

*Primary Examiner* — Nicholas A Smith
(74) *Attorney, Agent, or Firm* — Cort Flint; Thomas L. Moses; Southeast IP Group, LLC

(57) ABSTRACT

The invention relates to a method and device for treating liquids, particularly ocean, brackish water, refuse liquid, and waste water, wherein a hot carrier gas flow charged with water vapor is present in a predetermined treatment step as a hot water vapor carrier gas flow, particularly from a device for the treatment of liquids. According to the invention, at least a partial flow of the hot water vapor carrier gas flow is subjected to water vapor electrolysis in a water vapor electrolysis device in which at least part of the hydrogen and oxygen is separated from the hot water vapor carrier gas flow, and a dried carrier gas flow is created.

35 Claims, 4 Drawing Sheets

US 8,747,648 B2

METHOD AND DEVICE FOR TREATING LIQUIDS, USING AN ELECTROLYTIC STAGE

BACKGROUND OF THE INVENTION

The invention concerns a method and device for the treatment of liquids.

The liquids include wastewater, which encompasses, for example, solutions at various dilution strengths, seawater, brackish back water and the like, with particular emphasis on the runoff of once potable and industrial service waters. These input liquids are, in the following, designated as "feed-liquid." The generic EP 1 363 855 B1 discloses a method wherein the wastewater is subjected to evaporation by contact with a flow of high temperature carrier gas followed by condensation. The possibility exists, giving consideration to predetermined pressure and temperature of the carrier gas, that the carrier gas may bear and entrain water vapor in quantities which cannot be overlooked. The carrier gas, as air or an inert gas, enters the treatment process from a trap or from a more elaborate condensate removal apparatus in which it has been freed of water vapor in accord with its given pressure and temperature. However, the quantity of water vapor still resident in this hot carrier gas can reduce to an appreciable degree a further absorption capability from a desired maximum. This interference can diminish the overall efficiency rating of the entire treatment method.

EP 1 363 855 B1 clearly establishes, that the condensate obtained from the condensate separator is to be conducted to a collection tank. The so collected condensate still contains remnants of the carrier gas and is sent through a heat exchanger, which serves as a drying unit. Simultaneously, another condensate separator also feeds into the same heat exchanger. This has the result that water vapor, entrained or present as humidity, is removed from the first condensate. The now dried gas is then returned to the carrier gas supply. In this way, and most importantly, a loss of carrier gas from the closed circulation system is avoided.

In consideration of the above, it is the purpose of the present invention to make available a method and a device especially for the treatment of liquids, for example, seawater, brackish backwash, and the like, whereby in a simple and effective manner, a gas stream of the greatest possible dryness is to be obtained.

SUMMARY OF THE INVENTION

In accord with the invention, for the drying of gas, or for extended gas drying, at least one partial flow of a hot, gas, which is laden with water vapor and is considered to be hot water vapor laden carrier gas at high temperature, is subjected to a water vapor electrolysis, during which at least one part of the hydrogen and/or oxygen gases splits away from the hot water vapor laden carrier gas flow, whereby a dry carrier gas flow is obtained. Advantageous additional embodiments are respectively to be considered as objects related to those claims which bear thereupon.

Particularly advantageous in connection with an invented execution of a method of this type, may be found in that, because of the water already present in a vaporized form, a predominate lessening of the energy consumption necessary for the electrolysis can be attained. This diminution of the energy expended becomes possible, since the water vapor borne in the carrier gas flow has already received an input of energy in previous process steps as heat of evaporation. Consequently, the expenditure of energy for the accomplishment of electrolysis starts at a lower level. The water vapor carrying carrier gas is held at, advantageously, a temperature between 70 to 300° C., this can be, with greater preference, in a range of 90 to 250° C. and is under a pressure in keeping with the method within a range between 1 bar and 11 bar absolute. Simultaneous temperature and pressure are in agreement with the actual governing operational conditions for a (for example) water treatment or water purification apparatus which would also correspond to the temperature and pressure required for the execution of the water vapor electrolysis. In this way, the hot water vapor carrier gas flow, especially being the exit flow from a device for the treatment of liquids, such as seawater, brackish water, and/or reject water and/or wastewater, all of which will be subsequently explained in greater detail, can immediately and directly be subjected to the invented water vapor electrolysis for the purpose of drying the water vapor carrier gas stream and thereby capable of serving as a dried carrier gas flow. A dried, carrier, gas flow can be recycled back into the process once again, whereby this dried carrier gas flow can accept, in an essentially great quantity, a renewed loading of liquid vapor to be treated. This accepted amount is predominately greater than would have been the experience, if the drying were absent and the original, hot, water vapor were present in the carrier gas stream.

A particularly advantageous embodiment is evolved by means of water vapor electrolysis. This embodiment is a self-standing concept, which is independent of the drying of the hot, water vapor laden, carrier gas flow. This invented embodiment is created, when at least one partial flow is diverted from the full carrier gas flow, mixed with a reaction initiating flow (a hot water vapor laden initiating flow) and subjected to a water vapor electrolysis. As this occurs, at least one part of the hydrogen and/or oxygen will be split from the hot water vapor reaction initiating flow and a dried initiating flow is obtained. This a carried out preferably, with a water vapor laden initiating flow from a hot, water vapor laden, concentrated flow, which is drawn out of a concentrating device. To this concentration device, a high temperature, wet carrier gas flow mix is directed, which will be explained in the following in greater detail. In the case of conducting a method in this manner, then it becomes possible that such initiating flows, i.e. flows diverted from the carrier gas flow, can be employed for the obtaining of hydrogen and oxygen in quantities within the framework of the water vapor electrolysis. Preferably, the concern here is that such initiating or processing flows carry with them removed materials acquired during the preparation of the liquids in certain pretreatment operations. These would be, for example, dissolved materials in the liquid, which, however, could be a source of valuable substances subject to recovery. In the case of the water vapor electrolysis, such reaction initiating, i.e. process, flows thus call for a repeated drying. For this purpose, the already vaporized water, which is present, becomes a ground for a considerable reduction of the electrical energy consumption necessary for the electrolysis. In this way, the method become optimized by the recovery of valuable substances with a very low demand of energy.

Additionally to these just stated advantages, the invention possesses the advantage that with these waste liquids, the most purified water can be extracted as a result of the treatment thereof. This purified water, to name a few possibilities, can be recycled to other purposes, such as, fuel for internal combustion motors or as cooling means in power plants or other industrial equipment.

To cite the possibilities of electrolysis, one may mention an alkaline electrolysis, such as, for instance, the alkaline pressure electrolysis, the "Proton-Exchange-Membrane=Electrolysis" and the high temperature electrolysis, Further available are auto-thermal and allothermal electrolysis procedures. As inventive efforts have shown, the energy consumption for the invented gas drying of a hot water vapor laden carrier gas flow and/or a hot water vapor reaction initiating flow is generally measured at 2.7 kWh per cubic meter of hydrogen. On the other side, the energy demand for a conventional electrolysis for the production of hydrogen is essentially higher and lies, in accord with actual processes for such electrolysis, at about 9 to 18 kWh per cubic meter of hydrogen.

In accord with a particularly favorable way of conducting the method and developing the same, the hot water vapor laden, carrier gas flow and/or the hot water vapor initiating flow is sent to the water vapor electrolysis equipment. This described flow is thus introduced into the reaction space of the water vapor electrolysis equipment. In this space is to be found at least one anode and at least one cathode already in place. Further, the cathode is to serve as an electrode, to which electrical energy is supplied, preferably from a rectifier, this electrical supply being the still required electrical energy for the splitting off of the hydrogen and/or the oxygen.

Fundamentally, it is possible, that the entire hot, wet carrier gas flow can be transferred to the wet initiating gas flow. However, expert recommendation is, that the water vapor electrolysis be carried out with consideration given to predetermined parameters, such as:
 a. gas drying gradations,
 b. hydration requirements,
 c. need of oxygen,
 d. predetermined quantities of the hot wet carrier gas, and/or
 e. hot wet initiating gas.

Thereby, it becomes possible to establish, by a functional review of the at least one water vapor electrolysis device, an optimized gas or reactant gas drying procedure. Thus, for example, within the bounds of a predetermined preparation procedure and a known gradation of gas dryness, a defined partial flow of the wet carrier gas and/or wet reactant gas can be subjected to the drying process. In this manner, a carrier gas at a desired degree of dryness can be made available. Stated briefly, a quantity of the hot wet carrier gas, along with wet reactant gas, is controllingly added to the water vapor electrolysis apparatus. The control of the addition is carried out by a control center and/or measure based regulator placed in the feed line to the water vapor electrolytic apparatus. Additionally recommended is that the dried gas flow and/or the reaction-flow exiting the water vapor electrolysis apparatus be conducted through a metering device, by means of which, the content of hydrogen and/or oxygen in the gases can be determined. These data can then be transferred as parameters for process use. The data would be considered "as-is" parameter values, so that the quantities of the hot wet carrier gas and/or the reactant gas being conducted to the water vapor electrolysis apparatus are determined in a simple and direct way.

In accord with another especially, preferred embodiment and method of operation, provides that at least one part of the hydrogen and/or oxygen, which is yielded by the water vapor electrolysis apparatus be withdrawn and stored in a gas reservoir. The gas reservoir should be a pressure vessel or an intervening collection container. In order to isolate the so yielded hydrogen and/or oxygen, advantageously place between the water vapor electrolysis apparatus and the pressure vessel, an exhausting or pumping arrangement is provided. Preferably, in particular, a vacuum pump is provided. In order to prevent an undesirable back flow, which would be in the direction of the exhauster or vacuum pump, preferably, in the neighborhood of the respective pressure vessel, the process line is equipped with a check valve.

In accord with yet another embodiment of the invention, provision has been made, that, within the framework of the hydrogen and/or oxygen retrieved from the water vapor electrolysis apparatus, a fuel cell may be interposed. This fuel cell is to produce energy, which, in recycle, is immediately employed in the invented liquid treatment equipment, at which place it can reinforce the presently existing energy requirement. Especially advantageous is that by water vapor electrolysis both hydrogen and oxygen are produced, which are proportioned to be directly sent to the fuel cell. Basically, the possibility exists, that the hydrogen and the oxygen of the fuel cell may, more or less, originate from other than the cited source. The hydrogen and/or oxygen derived from the water vapor electrolysis can become predetermined "operational partners" by control and regulation means at defined times and in specified quantities. In this way, an optimum operation of the fuel cell can be guaranteed. Especially well recommended is a provision that the hydrogen and/or the oxygen from the water vapor electrolysis can be intermittently confined in a gas vessel and released therefrom to serve a given purpose of the fuel cell.

The electrical energy, which can be generated by means of the fuel cell can be sent to electricity consuming activities, especially those of the treatment procedure, among which would be the respectively provided water vapor electrolysis apparatus, which is served by an appropriate rectifier. Additionally, or alternatively, in this matter, it is possible that other electrical usages, such a for pumps, valves or the like can look to the fuel cell for power. Obviously, the electrical energy derived from the fuel cell can be sent to other consuming entities, these would include an electrical distribution network, or a thermal dryer. For example, the dryer could be applied within the present invention for the purpose of concentration of liquids, as will be, in the following, further described and explained.

Likewise, in accord with a particularly highly regarded embodiment of the present invention, which is intended for the avoidance of an undesirable backflow in the direction of the water vapor electrolysis apparatus as well as toward the respective vacuum pump, a non-return check valve is inserted in the piping circuit. The pipes connecting respectively between the water vapor electrolysis apparatus and, for example, the vacuum pump and the gas collection pressure vessel, lead to those electrodes with which the gas drawn by the vacuum pump is generated. For the generation of the gas, in the reaction space of the electrolysis apparatus, membranes are provided. These membranes act so that the respective, desired gas, i.e. hydrogen and/or oxygen, is directed to its corresponding electrode. Simultaneously, the remnant gas is held back in the electrolysis apparatus in the reaction space thereof as a purified, dried carrier gas.

This purified, dried carrier gas is then removed through a separate piping line to become the operative carrier gas. At least a part of this so formed carrier gas can be conducted to contact a liquid to be inventively treated. The liquid can be the above mentioned seawater, brackish back water, or wastewater or discarded treated water, all of which will be explained in greater detail in the following.

The gas storage container, consisting of a pressure vessel, is advantageously constructed in accord with an advantageous design including approved pressure codes and/or alarm signaling. A blow off apparatus possesses a relief valve, which reacts to predetermined excess pressure and discharges into a freely open line which contains, advantageously, at least one non-return check valve. This blow off apparatus, is bridged over by a separate relief line in which a mechanical safety valve is installed. The presence of this bypass line assures, that, for example, in a case of failure of the excess pressure sensor and/or the alarm apparatus, a free exit path for the over pressured gas is available. Preferably, the mechanical safety valve is provided with a high pressure threshold point, which will be such that this valve will only open after the excess pressure sensor and/or the alarm apparatus has acted. Thus, in any case, excess pressure relief for the gas storage container is assured and the gas can be freely vented.

An additional important advantage of the water vapor electrolysis in regard to water vapor in the carrier gas can be seen therein, in that it is basically possible to remove and store only the hydrogen, while the accompanying oxygen is remains undisturbed. In this way, the oxygen content of the carrier gas is increased and in a case of a desired incineration of wet material, this gas can be used as an oxidation means. In this way, no external source of oxygen need be employed. Alternative to this, it is possible that the evolved oxygen can also be removed and sent to an oxygen collection tank. This will allow, that at future determined times and in preliminarily set quantities, the so collected oxygen an be returned to the process as needed or where wet combustion is in order. Briefly, for example an oxygen retaining vessel can be served by an oxygen carrying pipe line, which would be provided with non-return check valves, by means of which a control means could feed a predetermined amount of oxygen into the dry carrier gas flow at defined time periods. Especially advantageously, the oxygen pipe line from the oxygen storage vessel is branched and opens into a pipe line which conveys dry carrier gas. Once again, it is also possible that oxygen can be diverted to other applications. Thus oxygen can be made available for additional oxidation purposes in biological wastewater equipment. The same may be said in relation to a water vapor reactant flow to which targets a water vapor electrolysis apparatus, as noted above.

In accord with an especially advantageous method of operating the invented process, provision has been made, to the effect that a liquid, which is to be treated in the dried carrier gas flow is apportioned and/or these split flows are sent to a predetermined number of treatment stations, in which the carrier gas is fractionated. That is to say, successively freed from interfering, gaseous substances and thereby a hot, water vapor carrier flow is created. In accord with a very advantageous embodiment of the present invention and method of carrying out the invented method, in this arrangement, the purpose is, that the treatment liquid, prior to its mix with the dried carrier gas, is subjected to the preheating and precleaning in at least one preheated separation apparatus. This apparatus includes in its assembly at least one preheat-heat exchanger and one separator which follows the heat exchanger. In this arrangement, the treatment liquid is preheated to a temperature which is less than the boiling point of the principal liquid.

In this way, the contaminants of lower vapor pressure evaporate from the principal liquid and/or the gaseous contaminants are thermally activated, whereby the vaporized and/or dispersed contaminants in the preheat-separator are split off. Advantageously, in this case, before the feed of the treatment liquid to a carrier gas mixing apparatus, these low boiling point, liquid contaminants and/or the gaseous interfering substances separate themselves from the treatment liquid. These would be the contaminants which could not be separated from the carrier gas prior to its feed into the treatment process. In the case of a measure of this kind, it is possible to achieve complete freedom of nearly all liquid and gaseous contaminants in the treatment liquid. This has the result, that the degree of efficiency of the entire equipment and process is made very high thereby, allowing the economy of the treatment to reach the highest possible level.

It is possible, with a method of this kind and a invented apparatus to treat a wide spectrum of the most different feed-liquids possessing a plurality of liquid and gaseous contaminants in an effective and economical manner. Thus, running such a method is particularly suitable for water treatment, namely for drinking water. The water to be treated could be seawater, industrial cooling water, and/or brackish back water. This is a particular advantage, since, within the bounds of the preliminary heating and purification, the carbon dioxide originally present as well as from the thermal disassociation of bicarbonates is separated out and removed. The salts contained in the basis liquid, can then, within the capabilities of evaporation, be caused to drop out as a brine in a separator. As has already been discussed, the concentrate from the concentrate separator is particularly well adapted to serve as a hot water vapor reactant, which can be sent to water vapor electrolysis or to a water vapor electrolysis apparatus. This is possible because the present concentration stream possesses a high liquid portion, which is necessary to maintain a workable viscosity of the concentrate. Since the concentrate, or better, the concentrate flow, is already within a temperature range of 100 to 150° C., this flow can very well be subjected to drying in a water vapor electrolysis apparatus in an energy efficient manner. This way of carrying out the treatment method has the advantage, that by means of this fractionated electrolysis, a separation of salts or metals, which are worth recovering, becomes possible. An additional essential advantage of a water vapor electrolysis of the hot concentration flow lies in that, within the capacity of the of electrolysis, heat input occurs. This heat input, combined with the preheating of the feed-liquid, can be advantageously made use of in connection with at least one heat exchanger dedicated to flows of concentrate and the feed-liquid. Before a mixing of the feed-liquid with dried carrier gas, this feed-liquid flows through the heat exchanger. A second drying of the concentrated flow is carried out until the flow is reduced to a granular mass. This second drying can be done in a thermal dryer, wherein the source of auxiliary heat would be, for instance, solar energy.

Advantageously, prior to the adding of the carrier gas, the expulsion of the gaseous contaminants out of the feed-liquid is achieved in that these gaseous contaminants cannot be enriched in an advantageously closed carrier gas circuit. In a favorable manner in the separating of gaseous contaminates from the carrier gas, control of the equipment is such that short, intermittent, still-stand periods are avoided. The favorable result of this is that an economical operation of such equipment with lengthy running periods is quite possible.

Additionally, and converse to conventional equipment, the piping and the individually included apparatuses are, all together, considerably less in length and number and dimensioning and layout are such that costs are reduced. This low cost can be, in part, attributed to the fact that by the elimination of the handling of liquid contaminates below their respective boiling points prior to their addition to the carrier gas, a portion of the feed-liquid has already been removed as the contaminates.

In the operation of a method and a device of the invented description will be found, first, advantageously a feed-liquid is combined with a carrier gas as a transport medium; second, a fractionalized removal of liquid contaminates in accord with their boiling points and/or; third, an expulsion is carried out of the gaseous contaminants in an environmentally sound recycling to form a treated basis liquid. The contaminants can be, however, valuable substances, which are to be recovered and not simply discarded.

A particularly advantageous degree of efficiency of the equipment and the process is achieved, when the liquids involved in treatment are fed in, one after the other, into at least two successive preheating separation units. In the case of this kind of a preheating and cleaning, a particularly superior and efficient separation action in regard to the expulsion of the low boiling point contaminates and/or the elimination of the gaseous contaminates is achieved. Such a high separation action permits reaching an especially high degree of efficiency of the equipment as well as attaining preheating and early cleaning. This can also be attained, if the liquid to be handled in the preheating heat exchanger enters at a preheated temperature close to the boiling point of the basis liquid. This is true, since an associated division of the preheated and precleaned feed-liquid into small element is favorable for the process and its efficiency.

In accord with another preferred embodiment of the present invention, provision is made that, the liquid which is to be treated and has been preheated in a preheating heat exchanger of a preheating separation apparatus is sent to an expansion relief apparatus, which is a component of the separation apparatus, wherein an effective separation from the low boiling point, vaporous and/or gaseous contaminants can be carried out. Especially advantageously, in this operation, it is possible that the low boiling point contaminants and/or the gaseous contaminants can be sent out of the expansion apparatus and sent as a component through a piping line to a cooling device and sent for storage into a collection container. In this way, during cooling, a low pressure is developed in the piping line, this being the piping line though which the separated contaminants are pulled by suction from the expansion apparatus. Advantageously, by this means the result is attained, in that the separation and removal of the contaminants can be accomplished in a simple manner and without extensive equipment and apparatuses. The pressure relief apparatus can, for this operation, be an expansion tank with a pump or even a pervaporation-membrane arrangement can be installed.

A particularly advantageous way of conducting the method is achieved by the use of an assembly, wherein the preheating heat exchanger is formed from a tank for handling condensate, whereby the heat source is hot condensate. In addition to this, it is possible that another input of heat for preheating the feed-liquid, in such a combination heat exchanger and condensate handling tank, can be carried out by retrieving the hot concentrate flow issuing from the water vapor electrolysis equipment. This flow can also be considered as a reactant, or, in case water vapor electrolysis is not present, then, as above, the source would be the hot flow issuing from the concentrate collection tank.

In such a case, then the heat exchanger for the concentrate wastewater of the at least one preheat-separator is preferably chosen as a source of heat. An advantage of such an operation is that, the overall energy consumption is considerably reduced The reason for this, is that nearly all hot flows are put to use for heating colder flows. This is particularly true, if, at least one part of heat input for evaporation is carried to the wet carrier gas vapor mix in the at least one evaporation/condensation heat exchanger by means of the issuing, compressed and cleaned mix of carrier gas and dry vapor mix.

Especially advantageous is the provision, that the carrier gas is contained in a separate carrier gas circuit, in order to reduce the loss of carrier gas. In a closed circuit of this type, it is possible, because of the small loss of carrier gas, to employ even relatively expensive inert gases as the carrier gas. In their function as a means of transport for the waste liquids, considered in opposition to the use of air, the normal expectation is that these inert gases, contrary to air, cannot react with certain other components, especially with gaseous components. Further, for the retrieval of remaining gas in the separated condensate, an additional gas drying operation is carried out following the condensate collection tank. This extra drying operation is to dry the wet remaining gas from the condensate collection tank and return this saved gas, now in a desirable dry state, to the carrier gas circuit. In a much shortened carrying out of the method and its apparatus, the condensate entering the condensate separator is removed by a condensate exit-line with a check valve and sent to a condensate collection tank. When this is done, then by means of a level indicator and controller, the system is practically free of carrier gas losses. The principal product of the condensate collection tank, which contains carrier gas components, is sent to the removal piping located on the topside of the condensate collection tank and eventually through a heat exchanger, which serves as a gas dryer and which has a subsequently attached condensate separator. This principal product is conducted through gas piping into an additional carrier gas circuit and once again, sent to the carrier gas lines.

Should the case be, that, for example, after a lengthy running time, nevertheless losses of carrier gas occur in the system, it is possible that in an additional manner, carrier gas can be replenished, by means of a carrier gas reservoir which is coupled with the carrier gas circuit. The input is done, in this case, by means of a simple connection into the present carrier gas circuit, so that the apparatus for this purpose is not blocked. This is an cost-saving measure, and assures a continuous running of the system.

Another productive possibility, especially regarding hydrogen obtained through the water vapor electrolysis is that, the hydrogen can be directed into an internal combustion motor, such as, for instance, an Otto motor, which could drive at least on compressor of the treatment equipment. If this internal combustion motor is coupled with an electric motor, then additional energy becomes available. This method of energy retrieval and energy recycling brings about a diminution of the primary energy consumption and also leads to a reduction of the environmentally unfriendly carbon dioxide loading of the atmosphere.

In the case of larger equipment, an advantageous recommendation that the energy requirement can be met by means of an independent source of current. Giving consideration to the purity, an energy source by means of, for example, windmill generation, would be an optimal manner, when combined with the use of hydrogen and oxygen for power. Optionally too, it is possible that the obtaining of energy can be accomplished by means of several alternatives. These could be photo-voltaic equipment, the surplus energy therefrom could be stored for future use and used as auxiliary power for gas treatment energy.

In addition again, a connection to a biomass heated network and/or a biogas generator is entirely possible. In such a case, wherein air is used as a carrier gas, this can be advantageously drawn out of the immediate atmosphere, for instance by means of a compressor intake, which should be provided with an air filter.

For the cleaning and maintenance of the equipment, advantageously, an appropriate wash-system can be provided. Such a wash system would possess a wash-water tank with a pump. With such equipment, the piping line could be cleaned. The wash liquid, or cleaning liquid, would be so selected that the needs of any current cleaning project could be met. Fundamentally, this means that a plurality of different cleaning liquids be kept available. The washing itself can be placed under a control system for the selection of a predetermined wash liquid for a current cleaning project. Particularly highly recommended is a device, or a procedure, in accord with which, a treatment liquid simultaneously serves a double function as a wash liquid and is so pumped through the washing circuit. The cleanings themselves are carried out for predetermined durations at specific times, which would be dependent upon predetermined requirements for such cleaning periods.

DESCRIPTION OF THE DRAWINGS

The construction designed to carry out the invention will hereinafter be described, together with other features thereof.

The invention will be more readily understood from a reading of the specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Liquids for the invented treatment system, that is, suitable for feed-liquids to the system, include solutions at various dilution strengths, seawater, brackish back water, and the like, all of which are to be treated to become suitable drinking and service waters.

Figure 1:
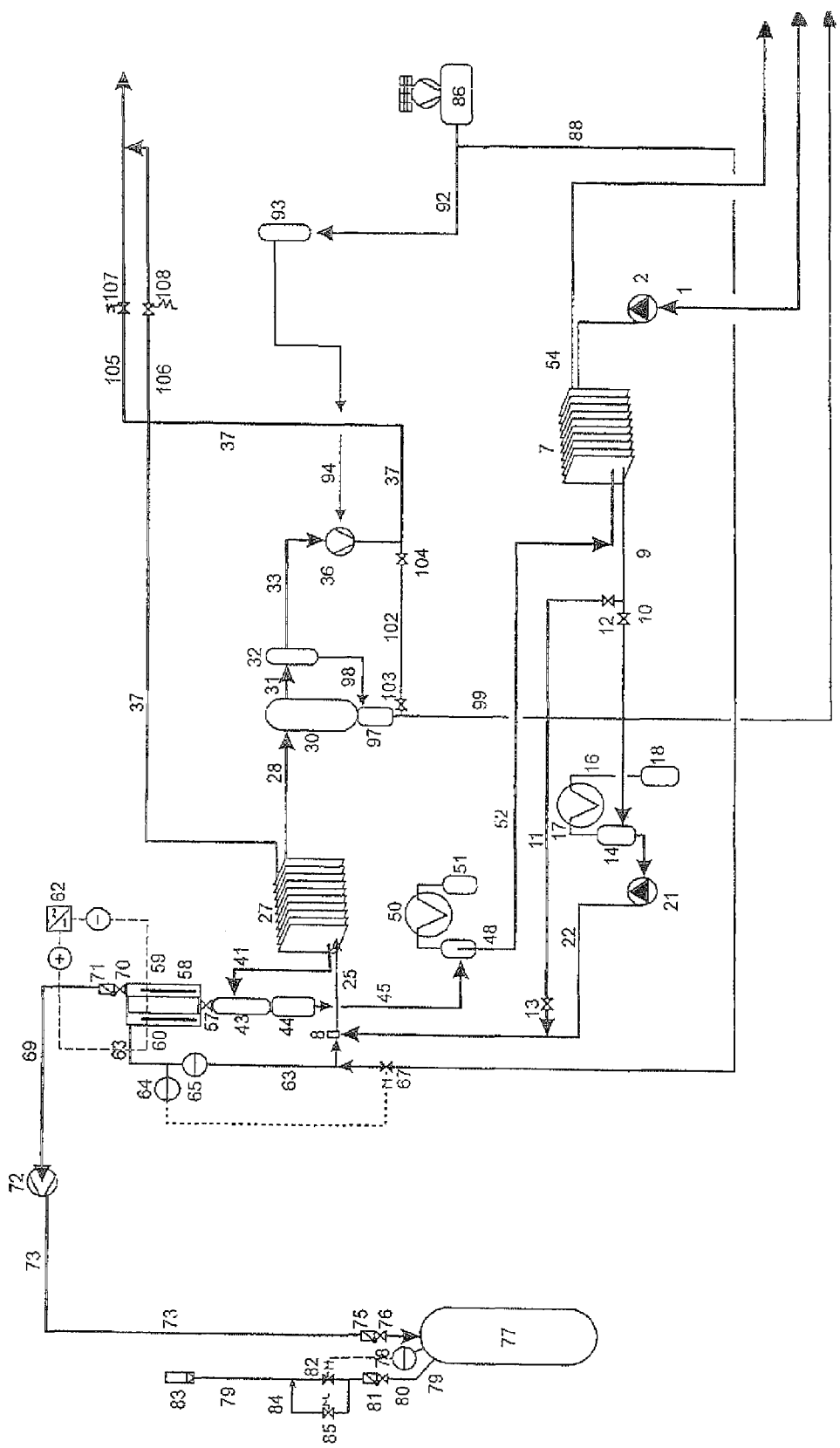
FIG. 1 is a schematic flow chart of a system for the treatment of a liquid in accord with a first process, wherein, hydrogen is split off within the capabilities of water vapor electrolysis.

As can best be seen in the flow diagram of FIG. 1, feed-liquid entry is accomplished by feed inlet 1, wherein a pump 2 supplies the transport energy. The outlet of pump 1 is to an assembly for preheating and precleaning. This assembly comprises a preheat heat exchanger 7 and a separator 14 placed thereafter. Preheat heat exchanger 7 is, in this case, constructed as a condensate treatment liquid heat exchanger, which will be explained in detail later. In preheat heat exchanger 7 the temperature of the feed-liquid, which is dependent upon the thereby attendant pressure, is brought to a level which is as near as possible to a desired vaporization temperature.

In separator 14, that is, where the entry feed liquids are concerned, a separation is carried out in accord with the currently present vaporization point of the feed-liquid and or of the possibly included inert gases and carbon dioxide which may have been evolved from the feed-liquid during preheating. The separated vapor and/or the inert and evolved gases are transported through a pipe line 16 (hereinafter, "line"). Line 16 leads to a cooling means integral with heat exchanger 17, from which the transported gases, now in a liquefied form, are delivered to a reservoir 18 for storage. Due to the above described cooling, a reduction in pressure is effected in line 16. The reduction in pressure provides auxiliary energy to permit the vapors and gases to issue from separator 14. In such a case, wherein no separation is found necessary in the separator 14, then the feed vapors can bridge separator 14 by means of a bypass line 11. Bypass line 11 is equipped with shutoff valves 12 and 13. The feed line from the preheat heat exchanger 7 leading to the separator 14 is designated as 9, and contains also shutoff valve 10, which would alternate as required with valve 12.

Separator 14, which also serves as an expansion, or pressure relief container, is provided with a pump 21, which, in combination with the separator completes the above mentioned pressure relief.

The feed-liquid, now preheated and cleaned and free of possibly interfering gases, is conducted through a line 22 to a mixing apparatus 8 which communicates through a line 63 with a source of carrier gas. In mixing apparatus 8 the preheated and precleaned feed-liquid is injected, in a finely divided apportionment, into a dried carrier gas flow which has been delivered by line 63. By means of a mixed gas line 25, this self augmented, wet carrier gas mix is fed to equipment 27 for evaporation, condensation, and heat exchange. In this multipurpose equipment 27, further heating takes place, which aims toward an over heating of the prepared feed-liquid and carrier gas mix. The required temperatures and operational pressures of the mix would be related in each case to the currently involved mix to be treated. With this caution, temperatures between 50 and 250° C. and operational pressure running within a range of 0.5 to 20 bar may be expected.

The wet carrier gas vapor mix with the remnant, which has higher boiling points than the base liquid and the salts, which are contained within the base liquid of the feed-liquid, are subsequently carried in a line 28 into a concentration based separator 30, in which this liquid remnant and/or a salt brine are separated out as concentrate. This concentrate separator 30 can, for example, be constructed as a cyclone or an impact plate separator. If the separator is of the impact plate type further possibilities include single plate and multi-plate separators.

Since at this point of the continuing system, the carrier gas and dry vapor mix, which no longer carries any remnant liquid, leaves concentrate separator 30 through line 31 and is sent to a drop separator 32, within which any concentrate still contained therein can be removed. The mix can be sent to a concentrate reservoir 97 through a line 98. The collected concentrate in reservoir 97 is removed through line 99, whereby the hot concentrate, if required, can be used to for the preheating of feed-liquid 1 in preheat heat exchanger 7 (not shown).

The carrier gas-dry vapor mix, which leaves the drop separator 32 is sent through a line 33 to a compressor 36, wherein the carrier gas-dry vapor mix is brought by simultaneous temperature rise to the desired operational pressure. This compressed carrier gas-dry vapor mix is run through a line 37 into an evaporation/condensing heat exchanger 27 and at that location is cooled down during the condensation of the dry vapor of the carrier gas-dry vapor mix. That is to say, in particular, the base liquid of the feed-liquid is reduced in temperature, whereby at the same time an increase in temperature is experienced by the wet carrier gas-vapor mix. This increase in temperature originates from the mixing of the dry carrier gas-vapor mix.

The above residual mix, which originates from the combined assembly of a condenser, evaporator and heat exchanger 27 is subsequently sent through line 41 to a condensate separator 43, wherein the condensate is removed. The condensate separator 43 can be, for example, an installed cyclone or an impact plate separator. That is to say, the impact plate unit can possibly be of single or multi-plate design.

The condensate, which drops out in the separator 43 is collected in a reservoir 44 for storage. A required, this condensate can be removed there-from through line 45 into another separator 48. In that separator 48, middle boiling point substances, such as, for example $H_4N_2$, $Cl_3N$, $H_2O_2$, $CCl_3NO_2$ are separated out with the aid of a cooling device 50 and stored in a collection tank 51. In this way, the condensate, which has been formed into a highly purified, base liquid is directed through a line 52 to heat exchanger 7 for preheating. From heat exchanger 7 the base liquid exits through line 54 and can be considered general service water.

The carrier gas, which is loaded with non-condensed water vapor flows from the condensate separator 43 as the hot water vapor carrier gas flow through a shutoff valve 57 into a reaction space of a water vapor electrolysis unit 58 in which is to be found at least one anode 60 and at least one cathode 59. These electrodes 59, 60 are provided with electrical energy by means of a rectifier 62. The cathode 59, in this arrangement, is separated from the reaction space by means of an ion-specific membrane, through which the produced hydrogen can diffuse, contrary to the remaining gas, which cannot so diffuse. Suction powered by a vacuum pump 72, removes hydrogen gas from the reaction space through line 69, in which line is placed a check valve 70 and non-return, safety valve 71. By means of a pressure line 73, in which again, a non-return safety valve 75 and a shutoff valve 76 are placed, the hydrogen is delivered or conducted to pressurized receiving tank 77. At the pressurized tank 77, is installed a pressure control and alarm apparatus for to maintain supervision and safety conditions. Further, any possible excess pressure can be vented through a line 79, a shutoff valve 80 and a non-return fitting 81, all of which lead to an automatic relief valve 82. In order to double the safety measures, a bypass line 84 is provided with a mechanical safety valve 85. Hydrogen, issuing therefrom is safely burned in a torch 83. The subsequently dried carrier gas proceeds out of electrolysis unit 58, through line 63, wherein a flow meter 65 is placed, along with coupled pressure and temperature meters 64. Continuing its flow, the dried carrier gas flows to recombine again in the carrier gas circuit.

As can be further inferred from FIG. 1, is that, considering lines 105, 106, with attached safety valves 107, 108, an emergency relief is provided in connection with pressure line 37. This arrangement will not be further described or explained.

In addition, between pressure line 37 and exit line 99, which is led out of the concentration reservoir 97, is provided a pressure line 102, which can be fed by shutoff valves 103 and 104. Cleaning wash for pressure line 37 can be injected from line 99.

As can be further seen in FIG. 1, it is possible, for example, that in the case of air being used as a carrier gas, this air could be delivered from ambient air by a compressor 85 with an intake filter. The air would be passed through a line 88 and injected into the carrier gas circuit. This injection operation would favor the running of the system, for example, by supplying carrier gas. Likewise, a feed of air as a blocking gas for the gasketing of the internal space of the compressor can be carried out through lines 92, 94. This blocking action would be done by an alternate involvement of the a reservoir 93 in the area of compressor 36. This is, fundamentally, to be considered independently of the present inventive concept. Accordingly, the applicant holds the possibility open, to enter additional claims for this alternate concept.

Figure 2:
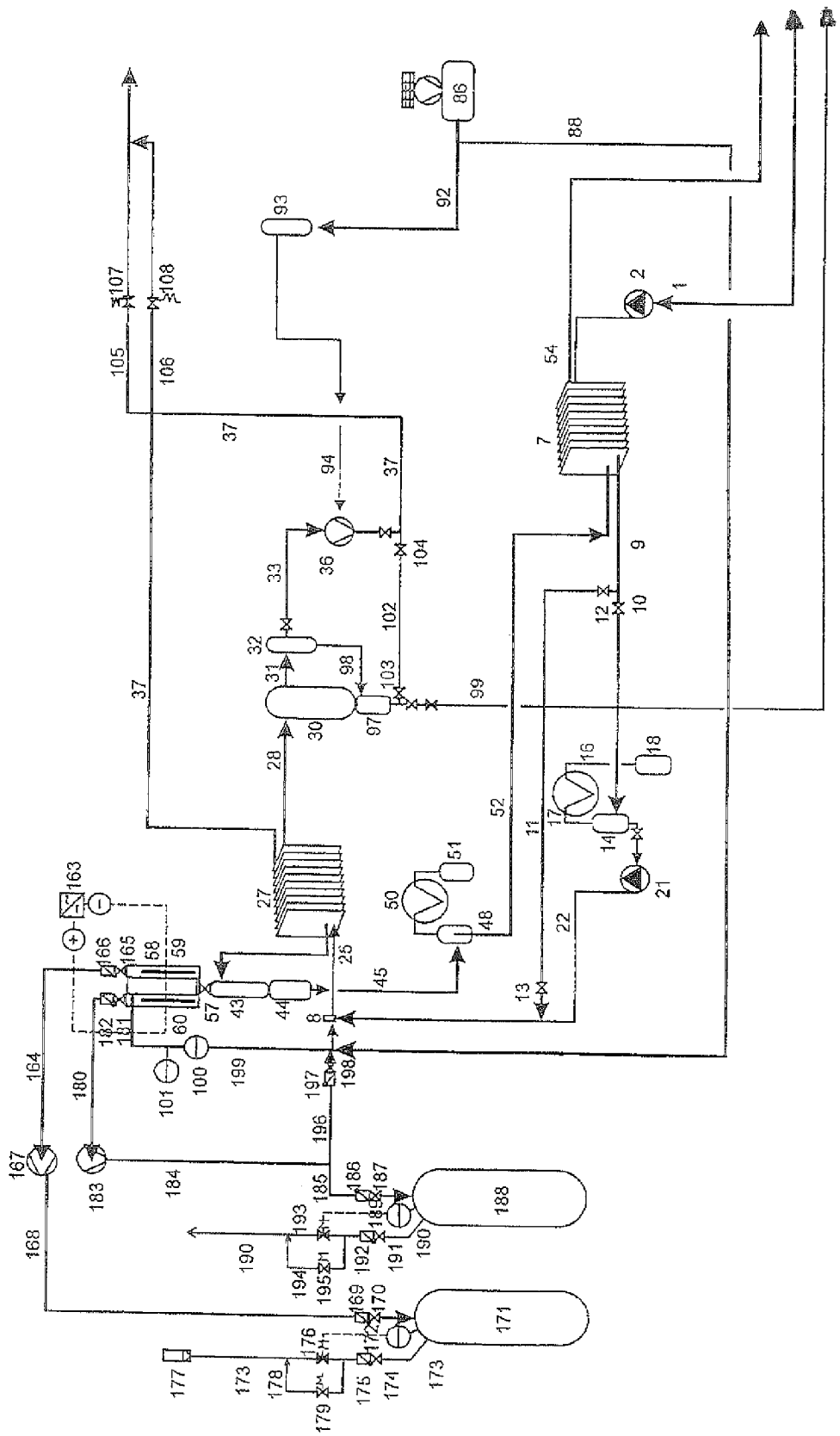
FIG. 2 is a schematic flow chart of a system for the treatment of a liquid showing an alternative method, wherein oxygen as well as hydrogen is split off within the capabilities of water vapor electrolysis.

As can best be seen in FIG. 2, a schematic flow chart of an alternative system is presented, which differentiates itself from the system of FIG. 1, particularly, in that the separation of both hydrogen and oxygen is shown, rather than the recovery of hydrogen alone. Consequently the basic subject in the following will concern the isolation of both hydrogen and oxygen. Where the remaining, identical equipment and arrangements are involved, reference can be made directly to FIG. 1.

The hot water vapor carrier gas proceeds, in FIG. 2, to the condensate separator 43 through shutoff valve 57 into a reaction space of the water vapor electrolysis unit, in which, once again, an anode 60 and cathode 59 serve as electrodes. The electrodes receive electrical energy which has been serviced by a rectifier 163. Both the cathode 59 as well as the anode 60 are separated by ion-specific membranes from the reaction space. Hydrogen, as well as the simultaneously released oxygen, respectively diffuse through the membrane. The remnant gas, i.e. the clean carrier gas is blocked from such passage. The hydrogen is propelled by vacuum pump 167 suction through a line 164, in which a shutoff arrangement 165 and a non-return valve 166 have been installed. The hydrogen is thereby confined in a gas tank 171. Gas tank 171 is provided, as before, with pressure control and alarm devices 172 for the supervision and safety of the system. Excess pressure can be relieved by a safety valve 176. To assure a further measure of safety, a torch 177 is placed to burn the hydrogen gas in a safe manner.

The simultaneously released oxygen is conveyed to a pressure controller 189 regulated gas container 188 by a vacuum pump 183 through a suction line 180, in which line are a non-return valve 182 and a shutoff valve 181. The oxygen passes subsequently through a line of pressure piping, namely 184 and 185. The line 185 is provided with a non-return valve and a shutoff valve 187. The pressure resistant gas container 188 for the oxygen is equipped with pressure relief safety arrangement. This arrangement consists of an exit line 190 with a non-return valve 192 and a shutoff apparatus 191. Further the exit line possesses a controlled pressure relief valve 193. Exit gas line 190 possesses in turn a bypass 194 wherein a mechanical safety valve 195 is placed. The oxygen pressure line 184 is connected with a pressure line 196 in which, as before, a non-return valve 197 and a shutoff valve 198 is installed. The purpose of this, is that, if required by a current situation, a partial reflux of oxygen can be made into the carrier gas circuit, in case this corresponds to necessities presented by a current task. The doubly dried carrier gas from electrolysis unit 58 is sent through carrier gas line 199, wherein a flow meter and measuring means are installed, along with a pressure and temperature indicator/controller 101. Carrier gas line 199 conducts the doubly dried carrier gas back into the carrier gas circuit.

Figure 3:
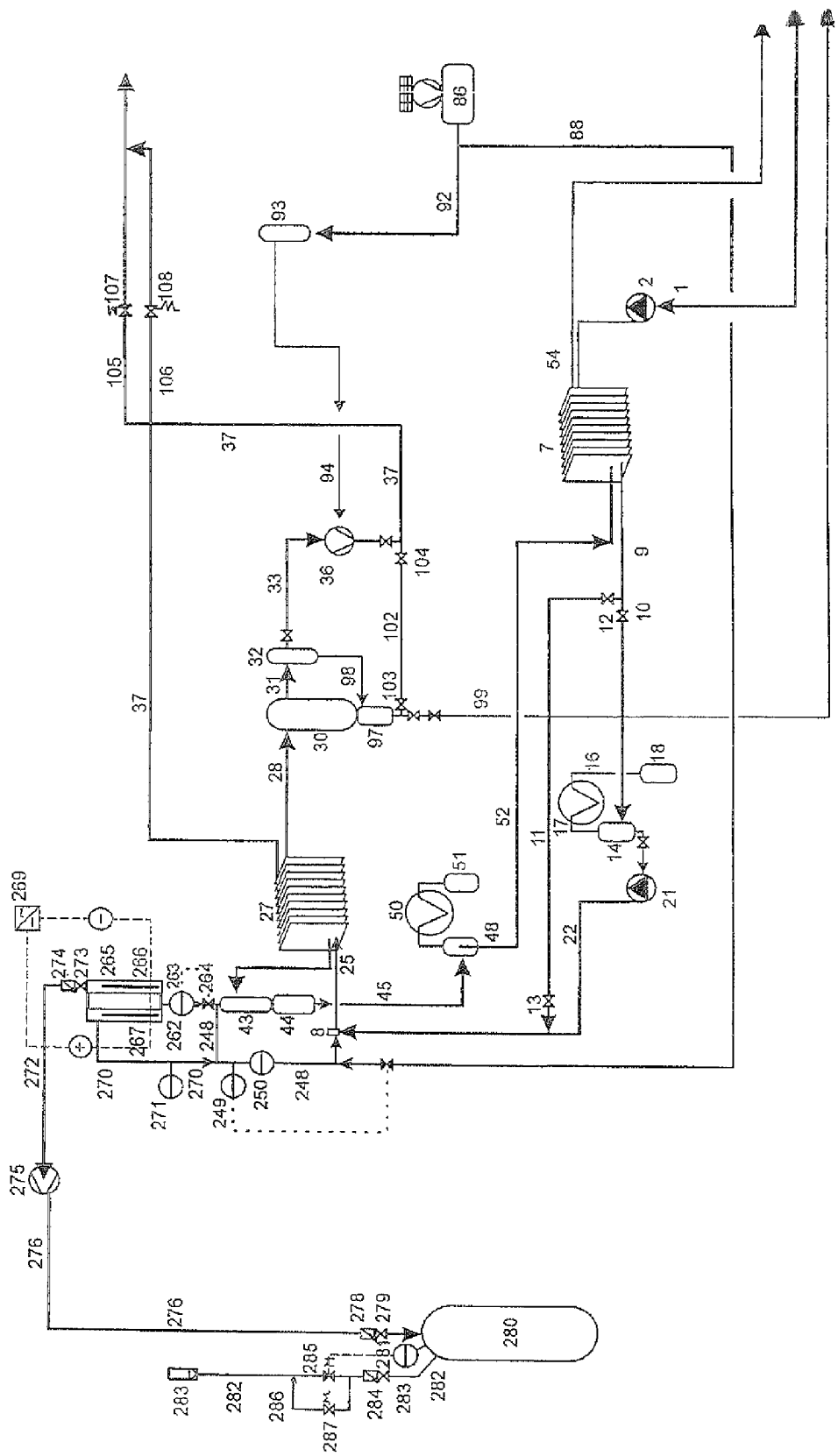
FIG. 3 is a schematic flow chart of a system for the treatment of a liquid showing an alternative method, wherein a control apparatus is provided, with which a water vapor electrolysis apparatus is combined with a predetermined quantity of a hot water vapor carrier gas mix.

As can best be seen in FIG. 3, a schematic flow chart is presented showing an alternate embodiment of the invented method. In this variant, the installed equipment is identical to that of FIGS. 1 and 2 so that, accordingly, references thereto can be directed to the descriptions of FIG. 1. The difference of the system shown in FIG. 3 to those of FIGS. 1 and 2, lies in the degree of dehydration of the "dried" gas flow. In other words, dependent upon need for the production of hydrogen, only a part of the hot, water vapor laden carrier gas is fed into the water vapor electrolytic unit. A chosen quantity of hot, wet water vapor laden gas mix, measured by means of a flow meter 263, is sent through a feed line 262 to the electrolytic cell, i.e. to the electrolysis unit 265. This chosen, i.e., preselected, quantity of mix is adjusted by flow meter 263 and is regulated in accord therewith by a control valve 264. In the electrolysis unit is at least one anode 267 and at least one cathode 266. These electrodes 266, 267 are provided with electricity by means of a rectifier. Cathode 266, in this arrangement, is separated from the reaction space by an ion-specific membrane, by means of which the released hydrogen can diffuse and the remnant gases cannot. The transport suction, generated by a vacuum pump 275, is made available within line 272, in which a shutoff valve 273 and a non-return valve 274 are installed.

By means of a pressure line 276, in which again, a non-return valve 278 and a shutoff valve 279 are placed, the hydrogen is confined in a pressurized retaining tank 280. Pressurized retaining tank 280 is provided with a pressure control apparatus and an alarm apparatus 281 for supervision and safety. Further, as a safety measure, excess pressure can be relieved through a line 282, which, again, has a shutoff valve 283 and a non-return valve 284. Any possible excess pressure can be vented by a safety valve 285 automatically. To increase safety, even above the stated items above, a bypass line 286 with a mechanical safety valve 287 is installed in the same manner as shown in FIG. 1. The exiting hydrogen, in this case, can again be burned in a torch 283 without harm to its surroundings. The double dried carrier gas leaves electrolysis unit 265 through line 270, in which a flow meter 250 and pressure and temperature measuring instruments 249 are installed. The dried carrier gas then rejoins the carrier gas circuit through a line 248. The partial hot water vapor laden carrier flow, which, possibly, was not introduced into the electrolysis unit 265, is carried by line 248 back into the carrier gas circuit, as was done in the previous manner. The content of hydrogen in the dried carrier gas flow can be measured by means of an appropriate meter 271, which meter has a retro-coupling to control valve 264 and possesses a common through flow metering by means of a quantity centered meter 263.

The method of operation of the system shown in FIG. 3 is analogous to that of FIG. 1, wherein the splitting off of the hydrogen is concerned. Obviously, variances can also find application in connection with the arrangement shown in FIG. 2, in accord with which, both the hydrogen gas and the oxygen gas are separately split off.

Figure 4:
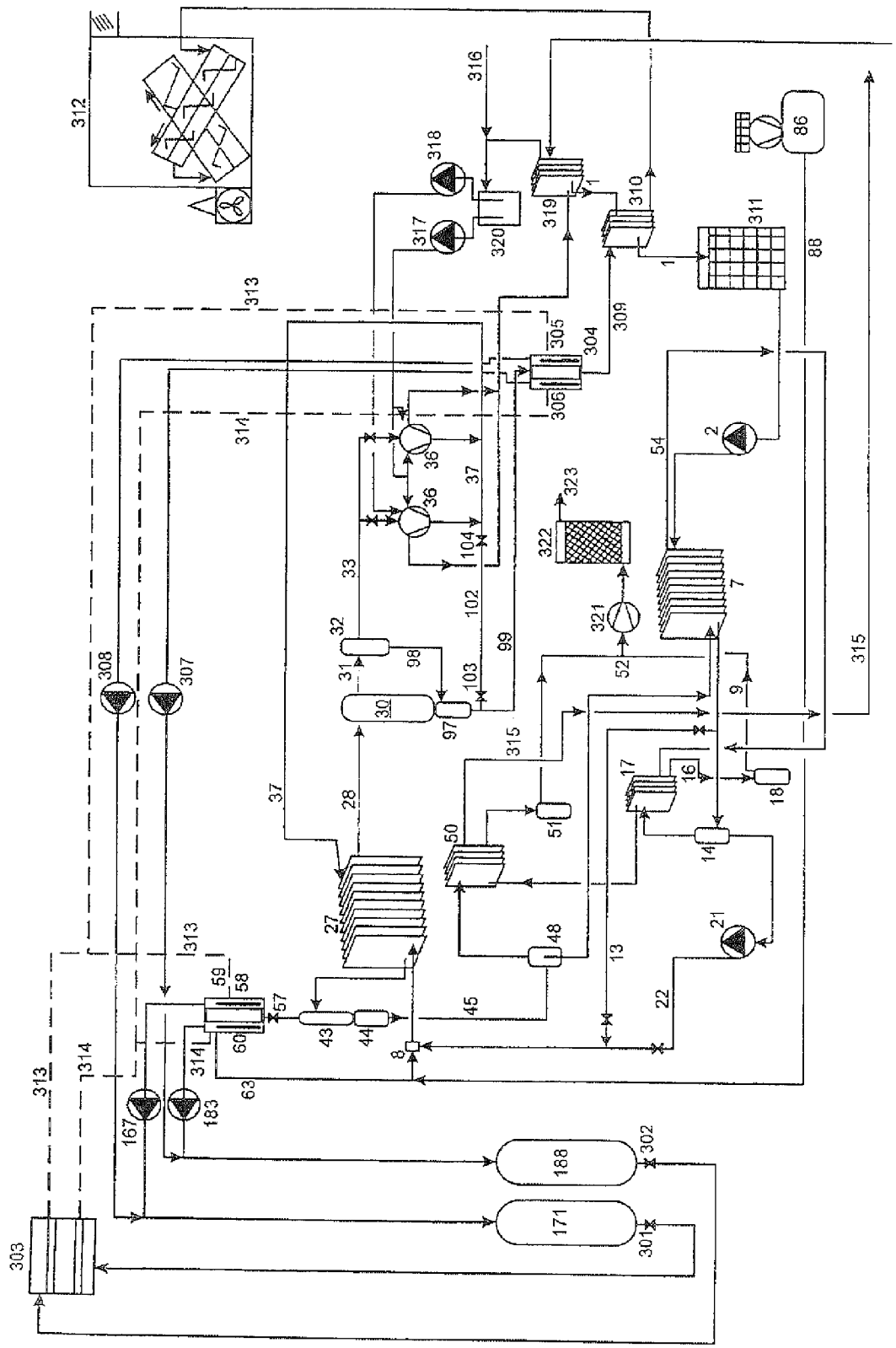
FIG. 4 is a schematic flow chart of a system for the treatment of a liquid with an additional alternative method, wherein a fuel cell is provided.

As can best be seen in FIG. 4, another embodiment of the method and device of the present invention is illustrated for the treatment of liquids, wherein the liquids are waste waters. The depicted flow chart indicates a system which is essentially based on the method of operation as shown in FIG. 2. In this system, a pressure resistant tank 171 serving as a reservoir for hydrogen and a similar reservoir containing oxygen are provided. Given the system arrangement up to this point, in the following the changes there from are to be explained.

By means of a valve assembly 301, 302, which respectively are controlled by predetermined operational parameters exercised by a control and regulation center (not shown), the occurrence is, that at specified times, a predetermined quantity of hydrogen and oxygen are extracted from the two pressurized gas reservoirs 171 and 188 and conducted to a fuel cell 303. Electrical energy can be generated at this fuel cell 303, which can be recycled, so to speak, to chosen electricity consumption components of the invented treatment system. This will be explained in the following.

As can be seen from FIG. 4, in a variation of the manner of carrying out the method described and explained in FIGS. 1 to 3, the hot concentrate, which issues from concentrate tank 97 and which concentrate contains a large portion of liquid content and is transported through line 99 to an additional water vapor electrolysis unit 304. In this instance, the entire concentrate is so transported, although the possibility exists, that only a portion thereof need be so transported. The water vapor electrolysis unit 304 is essentially the same design as the water vapor electrolysis 58 and possesses likewise at least one cathode 305 and at least one anode 306. In regard to its construction and manner of functioning, to avoid repetition a reference to construction of the water vapor electrolysis unit 58 is fully in order. The hydrogen produced in the water vapor electrolysis unit 304, as well as the oxygen, so produced, are respectively transported by vacuum pumps 307, 308 from the water vapor electrolysis unit 304 and stored in respective pressure tanks 171 (hydrogen) and 188 (oxygen).

The dried concentrate flow 309, leaving the water vapor electrolysis unit 304 is then directed to a combination concentrate treatment, liquid heat exchanger assembly 310. The heat exchanger has a circulation of the feed-liquid 1, whereby the hot concentrate flow 309 transfers heat to feed-liquid 1, for being preheated. Following this preheating, in the concentrate, treatment liquid heat exchanger assembly 310, to so preheated feed-liquid 1 is directed to a pre-pump arrangement 311, from which the feed-liquid, in its preheated state, can be removed by pump 2 in the previously explained manner.

The now cooled concentrate flow 312 in the heat exchanger 310, which counterflows concentrate vs. treatment liquid, can be, at this point, sent to the thermal dryer 312, which thermal dryer is energized by solar panels, in which dryer the final drying is accomplished and, for example, salts or metal can be retrieved for their value.

As is depicted by the dotted lines 212 and 314 in a predominately schematic manner, it is possible that the supply of energy for the water vapor electrolysis units 58 and 304 can, at least in part, be supplied by the electrical energy generated from the fuel cell 303.

In accord with yet another alternative version of the carrying out of the method as described in FIGS. 1 and 2, the system of FIG. 4 provides, that heat exchangers 17 and 50, which, in this order, function as cooling means, additionally treat the condensate flow exiting heat exchanger 7. By the effectiveness of the separation of the middle boiling point substances in the collection tank 51, and the effectiveness of the separation of the low boiling point, substances in the collection tank 18 can be once again increased. Fundamentally, a manner of conducting the method is also possible, in such a way, that the feed-liquid can be brought to condensation, by means not shown here. In accord with the through flow of heat exchangers 17 and 50, the condensate can be output from the treatment system as service water through a line 315. As this is also presented in FIG. 4, air can be exhausted from the tops of collection tanks 18, 51 and conducted through an excess air filter 322, before the air is released into the environment as cleaned air 323.

In a further variation to the method of operation shown in FIGS. 1 and 2, two compressors 36 are provided, to which the respective partial flows of the carrier gas dry vapor mix from the drop removal separator 32 are delivered. In the compressor 36, which is also known as a "booster" the carrier gas dry vapor mix, as previously described, is simultaneously brought up to the operating pressure and temperature. The use of two compressors 36 increases, this way, the throughput through this compression center. Optionally, in the presence of appropriate valve control, one compressor 36 can be made to run while the other compressor 36 is shut down. However, it is still possible that both compressors 36 can be switched to run simultaneously if circumstances demand. Fundamentally, it is possible that more than two compressors can be put into action, although that situation will not be described here.

For the cooling of the two compressors 36, a cooling circuit 316 is provided. This cooling circuit includes two pumps 317 and 318. With this arrangement, a cold agent cools compressor 36 and then, subsequently, in a preheated condition, is directed by a heat exchanger 319 for cooling fluid vs treatment liquid. This heat exchanger otherwise can also have a throughflow of feed-liquid 1 so the feed-liquid can be preheated. Briefly, in this case, the oil in the compressors 36 is essentially also cooled, in order that a diffusion of oil vapors into the compressor space is avoided and also to maintain a proper relationship with the lubrication system.

While a preferred embodiment of the invention has been described using specific terms, such description is for illustrative purposes only, and it is to be understood that changes and variations may be made without departing from the spirit or scope of the following claims.

The invention claimed is:

1. A method for the treatment of liquids, especially seawater, brackish back water, sewage, wastewater and the like, comprising introducing a predetermined quantity of one of said liquids as a feed liquid into a dry carrier gas flow to create a dry carrier gas flow mix; processing said dry carrier gas flow mix at a predetermined operational stage to produce a hot water vapor carrier gas flow; and subjecting said hot water vapor carrier gas flow to an electrolysis unit for separating at least a portion of one of hydrogen and oxygen from the hot water vapor carrier gas flow, whereby a dry carrier gas flow is produced.

2. The method of claim 1, including maintaining the hot water vapor gas carrier flow at a temperature range of about 70 to 300° C., this being preferably between 90 to 250° C.

3. The method of claim 2, including maintaining the hot water vapor carrier gas flow at an operating pressure in a range of about 1 and 11 bar absolute.

4. The method of claim 1, including a hot water vapor product carrying flow containing a product of the method, said hot water vapor product carrying flow including one of said hot water vapor carrier gas flow and a hot water vapor concentrate flow produced by a concentrate separator, wherein said method includes deducting a partial flow from said hot water vapor product carrying flow and subjecting said partial flow to said water vapor electrolysis unit.

5. The method of claim 1, conducting the hot water vapor carrier gas flow into a reaction space of the water vapor electrolysis unit, in which at least one anode and at least one cathode are placed as electrodes, and supplying the electrodes with electrical energy.

6. The method of claim 1, wherein a predetermined quantity of the hot water vapor carrier gas flow is conducted said electrolysis unit in response to at least one of dryness, hydration, and oxygen.

7. The method of claim 1, including regulating the quantity of the hot water vapor carrier gas flow conducted to the water vapor electrolysis by a control assembly including a flow meter placed in an inlet line of the electrolysis unit, and a control valve co-acting with the flow meter for regulating the flow of vapor whereby a regulation of through flow and quantity is provided.

8. The method of claim 1, including evaluating the content of at least one of said hydrogen and oxygen in the dry carrier gas flow issuing from said electrolysis unit.

9. The method of claim 8, including controlling the quantity of the hot water vapor carrier gas flow in response to the content of said at least one of oxygen and hydrogen.

10. The method of claim 9, including withdrawing and storing at least a portion of at least one of the hydrogen and oxygen from the water vapor electrolysis unit in a pressure resistant gas reservoir.

11. The method of claim 10, including delivering at least one of the retrieved hydrogen and oxygen to a fuel cell.

12. The method of claim 11, including storing at least one of hydrogen and oxygen in a respective gas storage tanks, and selectively withdrawing and delivering the hydrogen and oxygen at predetermined times and in predetermined quantities to a fuel cell for generating electrical energy.

13. The method of claim 12, including transmitting at least a portion of the energy generated at the fuel cell to at least one consuming item of electrical energy, wherein the consuming item can be the water vapor electrolysis unit for the hot water vapor carrier flow.

14. The method of claim 1, including delivering at least a partial quantity of said dry carrier gas flow to the feed liquid, apportioning the feed liquid in the carrier gas flow creating said dry carrier gas flow mix, transporting said dry carrier gas flow mix to a predetermined number of treatment stations, and fractionating the carrier gas flow mix to free the mix from at least one of solid, liquid, and gaseous contaminants in the feed liquid whereby said hot water vapor carrier gas flow is obtained.

15. The method of claim 1, wherein said feed liquid includes of a base liquid within which is a contaminant, and the method includes separating the contaminant from the base liquid in keeping with the physical and chemical properties of the contaminant, preheating and precleaning the feed liquid in at least one set of preheating and separating units in which the feed liquid is preheated to a temperature which is below the boiling point of the feed liquid so that low boiling point contaminates evaporate from the preheated feed liquid and gaseous contaminants are thermally expelled, removing the expelled contaminates, introducing said feed liquid to said dry carrier gas flow to form said dry carrier gas flow mix, converting said dry carrier gas flow mix into a wet carrier gas flow mix by adding heat to said wet carrier gas vapor mix, evaporating the feed liquid and contaminants which have boiling points above the boiling point of the feed liquid whereby a remnant liquid component remain as a brine component, sending said wet carrier gas vapor mix to a concentration separator in which the remnant liquid components are expelled as a concentrate, and the wet carrier gas vapor mix is freed from salt brine to provide a dry carrier gas vapor mix, compressing the dry carrier gas vapor mix, and subsequently cooling the carrier gas vapor mix so that the feed liquid condenses and is removed in a subsequent concentrate separator to produce said hot water vapor carrier gas flow which is fed to said water vapor electrolysis unit.

16. The method of claim 15, including delivering a concentrate which has been separated and concentrated in the concentrate separator, and is at a temperature in a range between 100 and 150° C., to a water vapor electrolysis unit, by means of which a dry concentrate flow is made available.

17. The method of claim 15, including transporting the feed liquid which has been preheated in at least one heat exchanger to an expansion apparatus of the preheater and separator unit, so that one or more of the low boiling point contaminants evaporate, and the gas forming contaminant components are separated out.

18. The method of claim 17, including preheating the feed liquid in a secondary liquid heat exchanger by means of which heat from the hot, dried concentrate flow in line is transferred to the feed liquid.

19. The method of claim 1, including preheating the feed liquid in at least one preheating heat exchanger to a temperature as close as possible to the vaporization temperature of the feed liquid.

20. The method of claim 1, including delivering the hydrogen to an internal combustion engine as fuel, and driving at least one compressor with the internal combustion engine.

21. The method of claim 20, including coupling an electro-generator to the internal combustion engine to drive the electro-generator, which produces electrical energy.

22. The method of claim 1, including, in case of a wet-oxidation process which is included in the treatment process, not separating oxygen from the carrier gas by means of the water vapor electrolysis unit.

23. An apparatus for the treatment of liquids such as solutions, seawater, brackish back water, sewage and wastewater, the apparatus being of the type including a feed liquid containing the liquid to be treated, a dry carrier gas flow serving as a transport means into which the feed liquid is introduced to become a part of a dry carrier gas flow mix, and at least one treatment station for converting the dry carrier gas flow mix into a hot water vapor carrier gas flow laden with water vapor, wherein the apparatus comprises at least one water vapor electrolysis unit, and at least a portion of the hot water vapor carrier gas flow is directed to the electrolysis unit for separation of at least one of hydrogen and oxygen from the hot water vapor carrier gas flow so that a dry carrier gas flow is produced.

24. The apparatus of claim 23, including at least one condensate separator for receiving the hot water vapor carrier gas flow, said condensate separator disposed in flow direction with said water vapor electrolysis unit to receive the hot water vapor carrier gas flow for removing condensate therefrom.

25. The apparatus of claim 23, wherein said water vapor electrolysis unit is disposed in a process line with a control valve downstream of the unit, said water vapor electrolysis unit having a reaction space in which at least one anode and one cathode is located as electrodes which are connected with an energy supply device.

26. The apparatus of claim 25, wherein the reaction space of the electrolysis unit includes a membrane arrangement placed in relation to the electrodes so that only one of the hydrogen and oxygen diffuses through the respective electrodes.

27. The apparatus of claim 23, including a hydrogen retaining tank serving as a gas reservoir for the hydrogen.

28. The apparatus of claim 23, including a regulated control valve installed upstream, process-wise, of the water vapor electrolysis unit, the control valve feeds the electrolysis unit a predetermined quantity of the hot water vapor carrier gas flow dependent on preselected parameters.

29. The apparatus of claim 23, including at least one preheating heat exchanger and one separator for preheating and precleaning the feed liquid, respectively, said heat exchanger preheating the feed liquid to a temperature less than the boiling point of the feed liquid, and the separator is disposed after the heat exchanger for separating contaminants in the feed liquid, a mixing device disposed after the separator for receiving the dry carrier gas flow from the electrolysis unit for apportioning the feed liquid and the dry carrier gas flow to form said dry carrier gas flow mix, an evaporation/condensation heat exchanger disposed after the mixing device for evaporating the dry carrier gas flow mix in which a base liquid is vaporized and liquid contaminates having a boiling point above the boiling point temperature of the base liquid remain as remnants, a concentrate separator disposed after the evaporation/condensation heat exchanger for separating concentrates of the dry carrier gas flow mix, and a condensate separator disposed after the concentrate separator for converting the dry carrier gas flow mix into the hot water vapor carrier gas flow.

30. The apparatus of claim 29, wherein the separated concentrate from the concentrate separator for the hot water vapor carrier gas flow is directed to a second water vapor electrolysis unit.

31. The apparatus of claim 30, including a liquid treatment heat exchanger disposed downstream of the second water vapor electrolysis unit for preheating the feed liquid, and said heat exchanger receiving a dry concentrate flow from the water vapor electrolysis unit and the feed liquid.

32. The apparatus of claim 23, including a fuel cell receiving predetermined amounts of the hydrogen and oxygen from the water vapor electrolysis unit according to given parameters.

33. The apparatus of claim 23, including at least one fuel cell to which is delivered at least one of the hydrogen and oxygen from the water vapor electrolysis unit in predetermined amounts according to given parameters.

34. The method of claim 15, including delivering a concentrate which has been separated and concentrated in the concentrate separator, said concentrate being at a temperature in a range between 100 and 150° C. to a water vapor electrolysis unit, and transporting the feed liquid which has been preheated in at least one heat exchanger to an expansion apparatus of said preheater and separator unit so that one or more of the low boiling point contaminants evaporate, and the gas forming contaminant components are separated out.

35. The method of claim 34 including preheating the feed liquid in a secondary liquid heat exchanger by means of which heat from the hot, dried concentrate flow in line is transferred to the feed liquid.

* * * * *